United States Patent
Tani

(10) Patent No.: US 9,303,988 B2
(45) Date of Patent: Apr. 5, 2016

(54) IMAGE MEASUREMENT APPARATUS, IMAGE MEASUREMENT METHOD AND IMAGE MEASUREMENT PROGRAM

(71) Applicant: CANON KABUSHIKI KAISHA, Tokyo (JP)

(72) Inventor: Kota Tani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 311 days.

(21) Appl. No.: 13/868,243

(22) Filed: Apr. 23, 2013

(65) Prior Publication Data

US 2013/0293701 A1     Nov. 7, 2013

(30) Foreign Application Priority Data

May 2, 2012   (JP) ................. 2012-105101

(51) Int. Cl.
 *G01C 11/02*   (2006.01)
 *G01B 11/00*   (2006.01)
 *G01B 11/245*   (2006.01)

(52) U.S. Cl.
 CPC .............. *G01C 11/02* (2013.01); *G01B 11/002* (2013.01); *G01B 11/245* (2013.01); *Y10S 901/46* (2013.01)

(58) Field of Classification Search
 CPC ....... G01B 11/022; G01B 11/024; G01B 7/18
 USPC ........................................................ 348/135
 See application file for complete search history.

(56) References Cited

U.S. PATENT DOCUMENTS

| | | | |
|---|---|---|---|
| 4,579,380 A * | 4/1986 | Zaremsky et al. | ......... 294/119.1 |
| 6,671,650 B2 | 12/2003 | Ogura et al. | |
| 7,359,817 B2 | 4/2008 | Ban et al. | |
| 7,899,577 B2 | 3/2011 | Ban et al. | |
| 2013/0021449 A1 | 1/2013 | Tani | |
| 2013/0336583 A1* | 12/2013 | Ernst et al. | .................... 382/165 |

FOREIGN PATENT DOCUMENTS

| | | |
|---|---|---|
| CN | 1374502 A | 10/2002 |
| CN | 1727839 A | 2/2006 |
| CN | 101100061 A | 1/2008 |
| JP | H07-286820 A | 10/1995 |
| JP | 2003-050107 A | 2/2003 |

OTHER PUBLICATIONS

Jul. 2, 2015 Chinese Office Action concerning corresponding Chinese Patent Application No. 201310157440.3.

* cited by examiner

*Primary Examiner* — Michael Lee
(74) *Attorney, Agent, or Firm* — Fitzpatrick, Cella, Harper & Scinto

(57) ABSTRACT

Two-dimensional measurement is allowed with a small error even in the case where a difference occurs between a measurement plane for a workpiece and a plane with calibrated external parameters. When the workpiece 2 is gripped by a holding device 3, an image measurement apparatus 1 calculates the difference between the calibration plane 17 where the external parameters are calibrated and the measurement plane 20 for the workpiece 2. The image measurement apparatus 1 corrects the external parameters such that the calibration plane 17 coincides with the measurement plane 20, and two-dimensionally measures the workpiece 2 using the corrected external parameters.

9 Claims, 11 Drawing Sheets

IMAGE MEASUREMENT APPARATUS, IMAGE MEASUREMENT METHOD AND IMAGE MEASUREMENT PROGRAM

BACKGROUND OF THE INVENTION

1. Field of the Invention

The present invention relates to an image measurement for measuring the two-dimensional position and/or posture of a workpiece from an image taken by a camera.

2. Description of the Related Art

In general, it has been known that the two-dimensional positional posture of an object to be imaged (hereinafter, simply called workpiece) can be measured from an image taken by a camera. The positional posture of an actual workpiece is represented by an actual spatial coordinates (world coordinate system), while the taken image is represented by image coordinates (image coordinate system). Thus, to measure the two-dimensional positional posture of the workpiece from the taken image, information on image coordinates [pixel] is required to be associated with actual spatial coordinates [mm]. That is, an imaging plane of the camera and a measurement plane for two-dimensional measurement are identified with reference to each other.

Identification of these two planes requires calibration of internal parameters (parameters, such as the image central position, the focal length and the distortion of a lens) and the external parameters (rotational parameters and translational parameters) of the camera.

Conventionally, the external parameters are calibrated, by imaging a calibration pattern whose relative positional relationship in an actual space has been preliminarily measured, and comparing relative positional relationship between the calibration pattern on the taken image and the calibration pattern in the actual space (Japanese Patent Application Laid-Open No. 2003-50107).

SUMMARY OF THE INVENTION

Unfortunately, according to the method by Japanese Patent Application Laid-Open No. 2003-50107, if there is a difference between a plane with calibrated external parameters and a plane on which a measurement object is actually placed, a measurement error occurs. Typically, in the case where a workpiece is placed on a fixed plane, a large difference does not occur between a plane on which external parameters are calibrated (hereinafter, called a calibration plane) and a measurement plane for the workpiece. Accordingly, such a measurement error causes no problem. However, in the case where a workpiece is gripped by, for instance, an end effector of a robot arm, the positional posture of the workpiece may be changed according to the grip position of the workpiece. In this case, the difference between the calibration plane and the measurement plane for the workpiece is large. This difference causes a problem in that the measurement error based on the difference between the planes becomes large accordingly.

It is thus an object of the present invention to allow two-dimensional measurement with a small error even in the case where a difference occurs between the measurement plane for the workpiece and the plane with calibrated external parameters.

An image measurement apparatus according to the present invention includes: a first camera that takes an image of a workpiece held by a holding device; a detecting device that detects a position and/or a posture of a measurement plane for the workpiece held by the holding device; and a control unit that stores external parameters of the first camera and a position and/or a posture of a calibration plane where the external parameters are calibrated, corrects the external parameters based on a detected value by the detecting device such that the positions and/or the postures of the measurement plane and the calibration plane coincide with each other, and measures a two-dimensional position and/or a posture of the workpiece from the image taken by the first camera using the corrected external parameters.

An image measurement method according to the present invention is a method of causing a camera whose external parameters are calibrated, to take an image of a workpiece held by a holding device, and measuring a two-dimensional position and/or a posture of the workpiece based on the taken image, the method comprising causing a calculating device to: calculate a difference between a calibration plane where the external parameters are calibrated and a measurement plane for the workpiece; correct the external parameters based on the difference calculated by the difference calculating such that positions and/or postures of the measurement plane and the calibration plane coincide with each other; and two-dimensionally measure a two-dimensional position and/or posture of the workpiece from the image taken by the camera using the external parameters corrected by correcting of the external parameters.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Configuration of Image Measurement Apparatus

Figure 1:
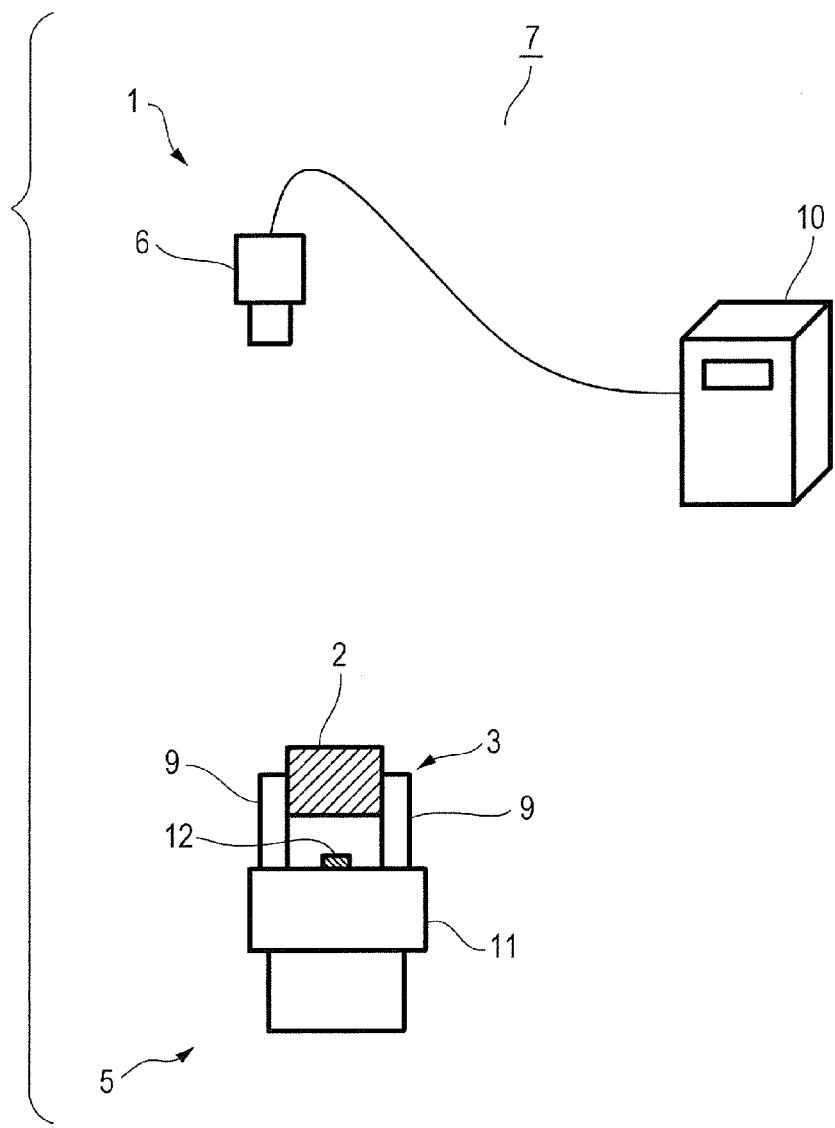
FIG. 1 is a schematic diagram illustrating an automatic assembling apparatus including an image measurement apparatus according to a first embodiment of the present invention.

An image measurement apparatus 1 according to a first embodiment of the present invention will hereinafter be described with reference to drawings. As illustrated in FIG. 1, an automatic assembling apparatus 7, which automatically assembles a product on a production line while gripping a workpiece 2, includes a robot arm 5 at a distal end; this arm includes a holding device 3 for holding a workpiece 2. The automatic assembling apparatus 7 includes a camera (first camera) 6 that takes an image of the workpiece 2 held by the holding device 3, and a control unit 10 to which the camera 6 and the robot arm 5 are connected.

The holding device 3 is a chuck that grips the workpiece 2. More specifically, the holding device 3 includes a finger (clamp) 9 that clamps the workpiece 2, and a main body 11 to which the fingers 9 are attached. The main body 11 is provided with a length measuring instrument (detecting device) 12 for detecting a grip position of the workpiece 2. The automatic assembling apparatus 7 thus includes the camera 6, the control unit 10 and the length measuring instrument 12, which configure an image measurement apparatus 1.

Figure 2:
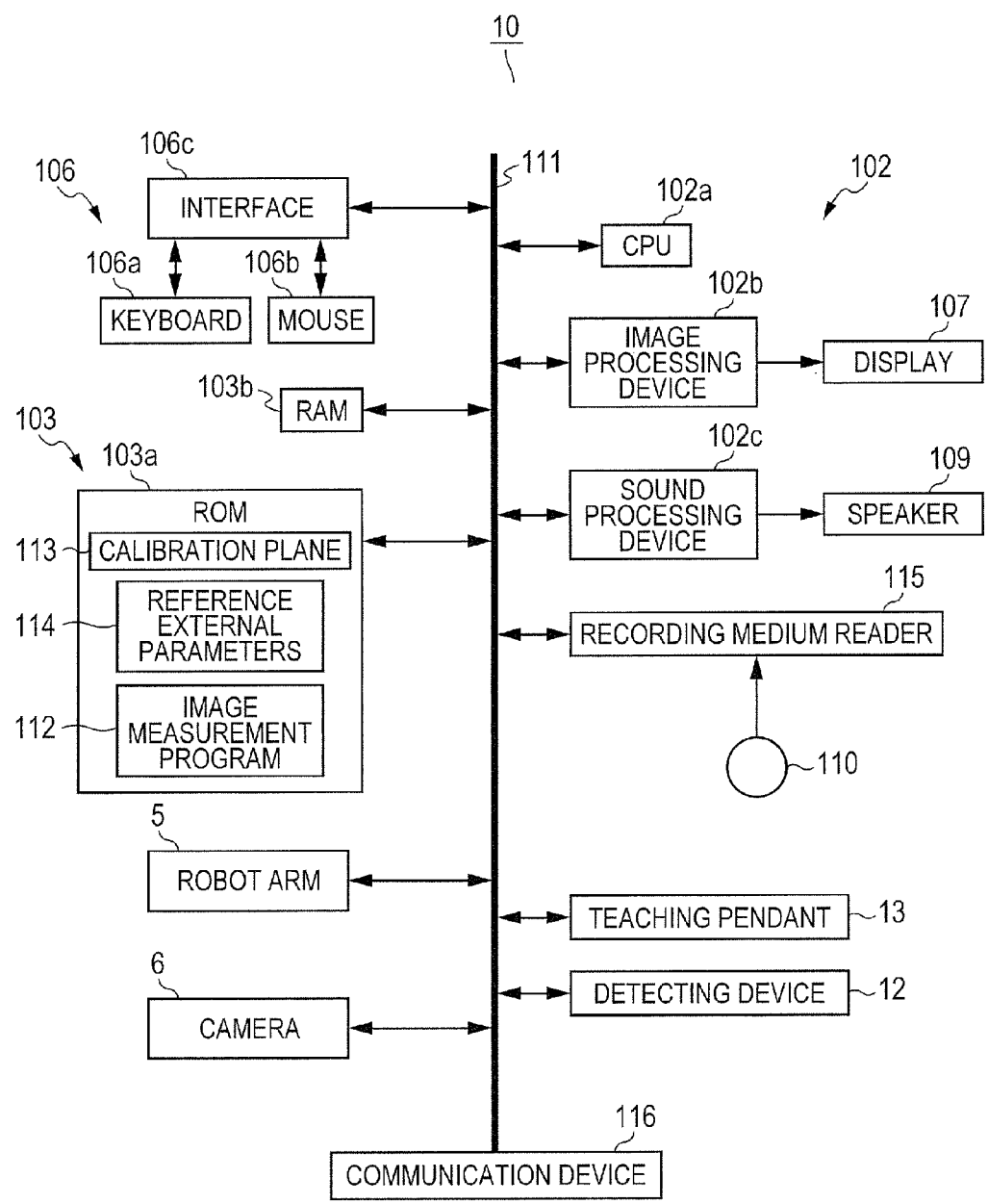
FIG. 2 is a schematic diagram illustrating a control unit of the image measurement apparatus of FIG. 1.

As illustrated in FIG. 2, the control unit 10 includes the main body of a computer including a calculating device 102 and a storing device 103. The robot arm 5, the camera 6 and the length measuring instrument 12 are connected to the computer. An input device 106 for allowing an operator to perform an input operation, a teaching pendant 13 and a display device 107 are also connected to the main body of the computer.

The storing device 103 is stored with external parameters (hereinafter, called reference external parameters) 114 of the camera 6, and a data 113 of the position and posture of the calibration plane where the reference external parameters are calibrated. This storing device is further stored with various programs, such as control drivers for the robot arm 5 and the camera 6, and an image measurement program 112 causing a computer to correct the reference external parameters 114 and to two-dimensionally measure the workpiece 2.

More specifically, the main body of the computer includes a CPU 102a as a principal component, an image processing device 102b and a sound processing device 102c, which configure the calculating device 102. Not only the image processing device 102b and the sound processing device 102c but also a ROM 103a and a RAM 103b are connected to the CPU 102a via a bus 111. The ROM 103a is stored with a program required to basically control the computer, various programs including the image measurement program 112, and data. A working area for the CPU 102a is secured in the RAM 103b. The image processing device 102b controls a liquid crystal display as the display device 107 according to a drawing instruction from the CPU 102a to cause this display device to display a prescribed image on the screen. The sound processing device 102c generates a sound signal according to a sound generating instruction from the CPU 102a and outputs the signal to a speaker 109.

A keyboard 106a and a mouse 106b, which configure an input device 106, are connected to the CPU 102a via an input interface 106c connected to the bus 111. This connection allows designation information required for assembling the workpiece 2 or other instructions to be input.

The robot arm 5 and the camera 6 are connected to the bus 111. The recording medium reader 115 is also connected to the bus 111, and reads a recording medium 110 stored with the image measurement program 112, and can store the program in, for instance, the ROM 103a. The storing device 103 includes the ROM 103a and the RAM 103b, which are main storing devices, and further includes an external storing device.

Furthermore, a communication device 116 is connected to the bus 111. This connection allows the image measurement program 112 distributed from the Internet or the like to be downloaded via the communication device 116 without use of the recording medium 110.

In this embodiment, the control unit 10 is a computer to which the camera 6 is connected. However, a calculating device embedded in the camera 6 may configure the control unit integrally with the computer. Instead, only the calculating device of the camera 6 may configure the control unit.

Two-Dimensional Measurement Operation

Two-dimensional measurement by the image measurement apparatus 1 on the workpiece will now be described based on FIGS. 3 to 7B. First, the image measurement apparatus 1 calibrates the external parameters using the calibration reference 15; this calibration is a preparatory process for two-dimensionally measuring the workpiece. The image measurement apparatus 1 thus acquires the reference external parameters 114.

Figure 3:
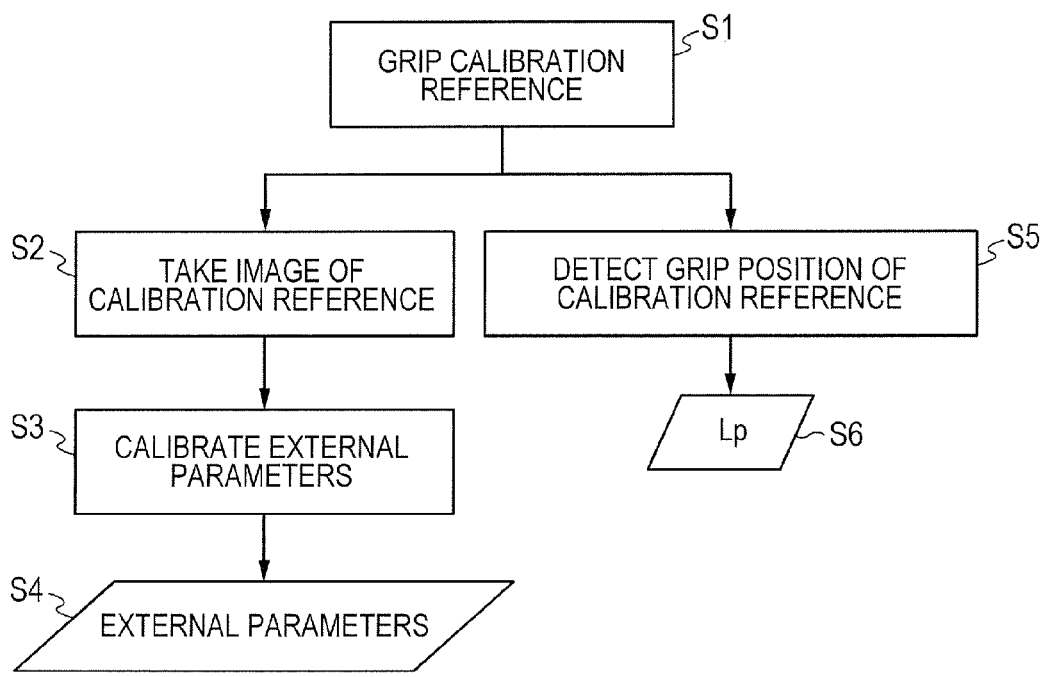
FIG. 3 is a flowchart illustrating calibration on external parameters by the image measurement apparatus in FIG. 1.
Figure 4A:
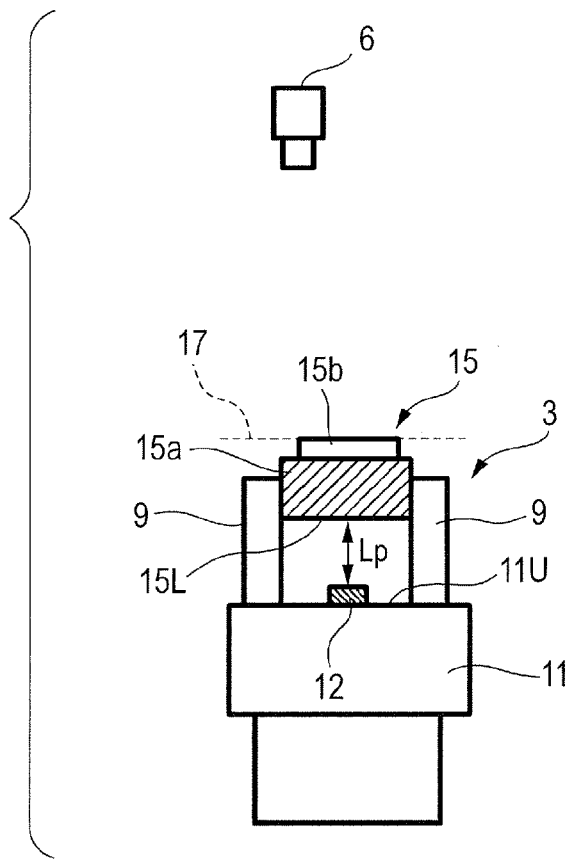
FIG. 4A is a schematic diagram illustrating the image measurement apparatus in calibration on the external parameters.
Figure 4B:
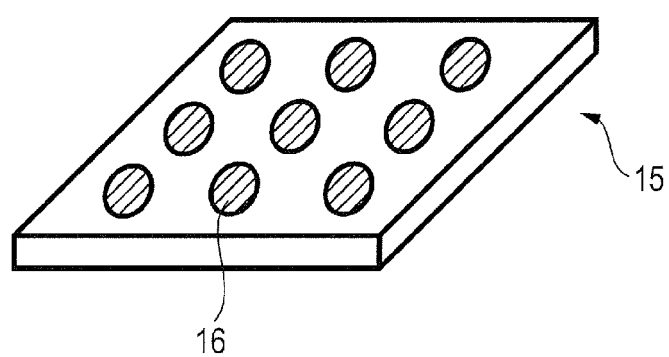
FIG. 4B is a schematic diagram illustrating a calibration reference.
Figure 5:
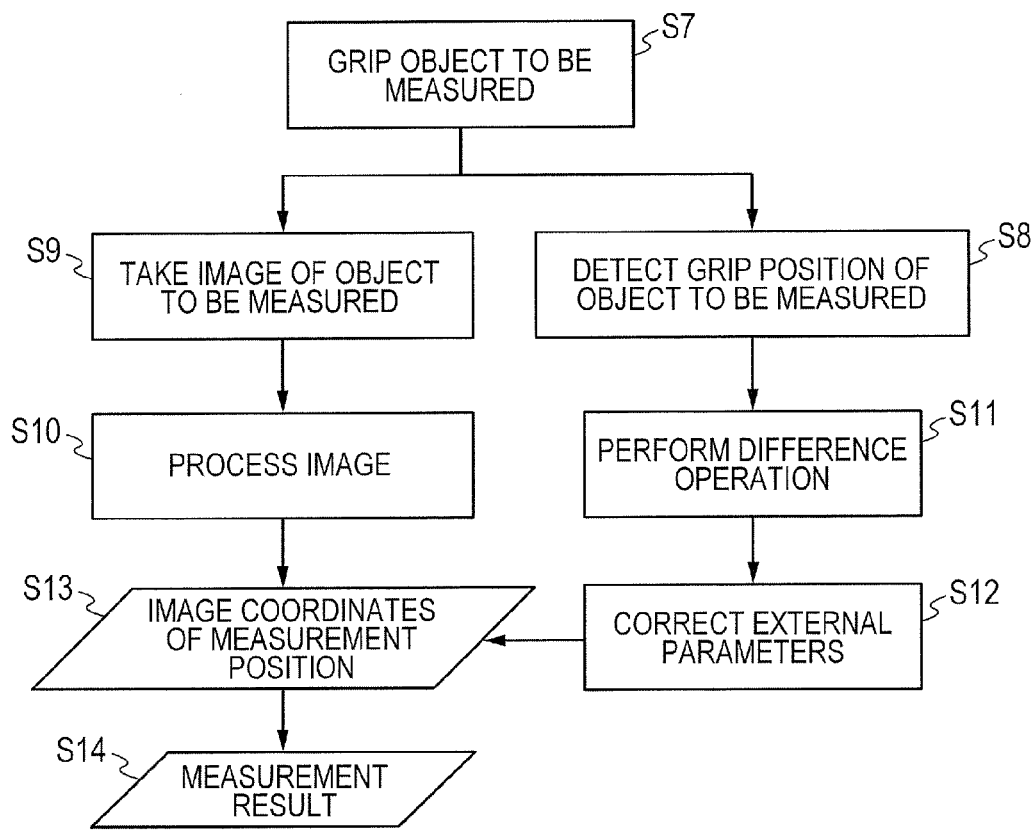
FIG. 5 is a flowchart illustrating two-dimensional image measurement by the image measurement apparatus in FIG. 1.

More specifically, as illustrated in FIGS. 3 and 4A to 4B, the image measurement apparatus 1 causes the holding device (hereinafter, simply called a chuck) 3 of the robot arm 5 to grip (hold) the calibration reference 15 (step S1 in FIG. 3, a step of holding a workpiece). As illustrated in FIG. 4A, the calibration reference 15 includes an attachment 15a for allowing the chuck 3 to grip this reference, and a calibration board 15b mounted on the attachment. A calibration pattern including circular markers 16 arranged into a 3×3 matrix is formed on the upper surface of the calibration board 15b. The image measurement apparatus 1 causes the camera 6 to take an image of the calibration pattern (S2, a step of imaging the calibration reference).

The taken image of the calibration pattern is transmitted to the control unit 10. The control unit 10 calibrates the external parameters using the image (S5, a step of calibrating external parameters). More specifically, first the control unit 10 acquires the coordinates [u, v] of each marker 16 in the image coordinate system based on the taken image. The relationship between the coordinates of the markers 16 in the image coordinate system and the coordinates of the markers 16 in the world coordinate system, which is a coordinate system in an actual space, can be represented by following Equation (1).

$$s \begin{bmatrix} u \\ v \\ 1 \end{bmatrix} = A[R, t] \begin{bmatrix} Xr \\ Yr \\ Zr \\ 1 \end{bmatrix} \quad \text{Equation 1}$$

A: internal parameter, [R, t]: external parameters,
[Xr, Yr, Zr]: the coordinates of each marker 16 in the world coordinate system.

Provided that a calibration plane 17 on which the calibration pattern exists is defined as XY plane, Equation (1) can be represented by following Equation (2).

$$s\begin{bmatrix} u \\ v \\ 1 \end{bmatrix} = A[R, t]\begin{bmatrix} Xp \\ Yp \\ 0 \\ 1 \end{bmatrix}$$ Equation 2

The relative positional relationship of the markers 16 of the calibration pattern is known. Accordingly, provided that one of the markers 16 is the origin, [Xp, Yp, 0] of each marker 16 is known. The control unit 10 solves Equation (2) of each of the markers using a mathematical method, such as a least-square method, thereby calibrating the external parameters [R, t]. After the external parameters [R, t] are calibrated, the calibrated external parameters are stored as the reference external parameters 114 in the storing device 103 (S4, a step of storing external parameters).

When the calibration reference 15 is gripped by the chuck 3, the image measurement apparatus 1 detects the grip position of the calibration reference 15 while calibrating the external parameters. That is, a length measuring instrument 12 provided on the upper surface 11U of the main body 11 of the chuck 3 measures the distance Lp to the undersurface of the calibration reference 15 (S5, a step of detecting a calibration plane). The control unit 10 stores the distance Lp in a direction orthogonal to the calibration plane 17 as the grip position (S6, a step of storing the grip position).

In other words, the control unit 10 stores the distance Lp as the position of the calibration plane 17 on which the external parameters have been calibrated, and the length measuring instrument 12 serves as the detecting device that detects the position of the calibration plane 17.

The internal parameters of the camera 6 have been calibrated before the calibration on the external parameters. The calibration pattern may be any form only if the pattern has at least three markers that do not align in one line. The shape of the markers may be any of a lattice and a three-dimensional shape, such as a cylinder. Furthermore, the shape of the calibration reference 15 may be any of shapes, such as a cube and a board.

After the calibration on the camera parameters (the external parameters and the internal parameters) is completed, the image measurement apparatus 1 comes into a state of allowing the workpiece 2 to be two-dimensionally measured. The operation of the image measurement apparatus 1 in actual two-dimensional measurement on the workpiece 2 will hereinafter be described based on FIGS. 5 to 7B.

Figure 6:
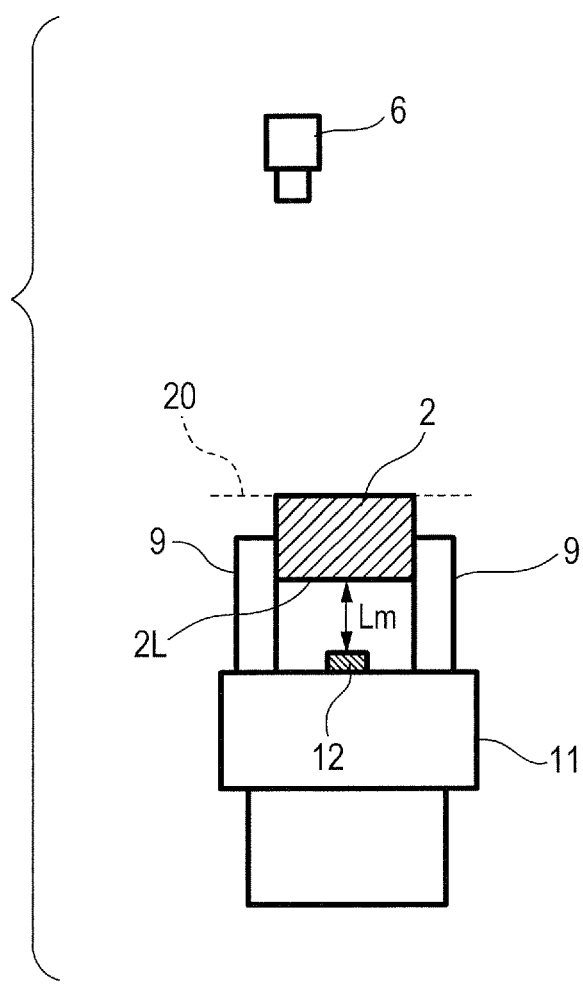
FIG. 6 is a schematic diagram illustrating the image measurement apparatus in two-dimensional measurement on a workpiece.

As illustrated in FIG. 6, when the workpiece 2 is gripped by the chuck 3 of the robot arm 5 on the production line (S7 in FIG. 5, a step of gripping the workpiece), the distance Lm to the undersurface 2L of the workpiece 2 is measured by the length measuring instrument 12 (S8, a step of detecting the workpiece grip position).

The control unit 10 stores the distance Lm detected by the length measuring instrument 12 as the grip position (holding position) of the workpiece 2 in the storing device 103. That is, the length measuring instrument 12 serves as the detecting device that detects the position of the measurement plane 20 for the workpiece gripped (held) by the chuck (holding device) 3. The control unit 10 stores the distance Lm as the grip position of the workpiece 2, i.e., the position of the measurement plane 20 for the workpiece 2.

When the workpiece 2 is gripped by the chuck 3, the image measurement apparatus 1 causes the camera 6 whose internal and external parameters are calibrated to take an image of the workpiece 2 (S9, a step of imaging the workpiece). The control unit 10 applies image processing to the taken image of the workpiece 2 to acquire coordinates [u, v] of a measurement point of the workpiece in the image coordinate system (S10, a step of image processing).

Here, a deviation of the grip position caused when the chuck 3 grips the workpiece 2 may cause a deviation between the measurement plane 20 on which the measurement point of the workpiece 2 exists and the calibration plane 17 where the reference external parameters 114 are calibrated. Accordingly, the control unit 10 calculates the difference between the measurement plane 20 for the workpiece 2 and the calibration plane 17 where the reference external parameters 114 are calibrated, from detected values by the length measuring instrument 12 (S11, a step of calculating a difference).

Figure 7B:
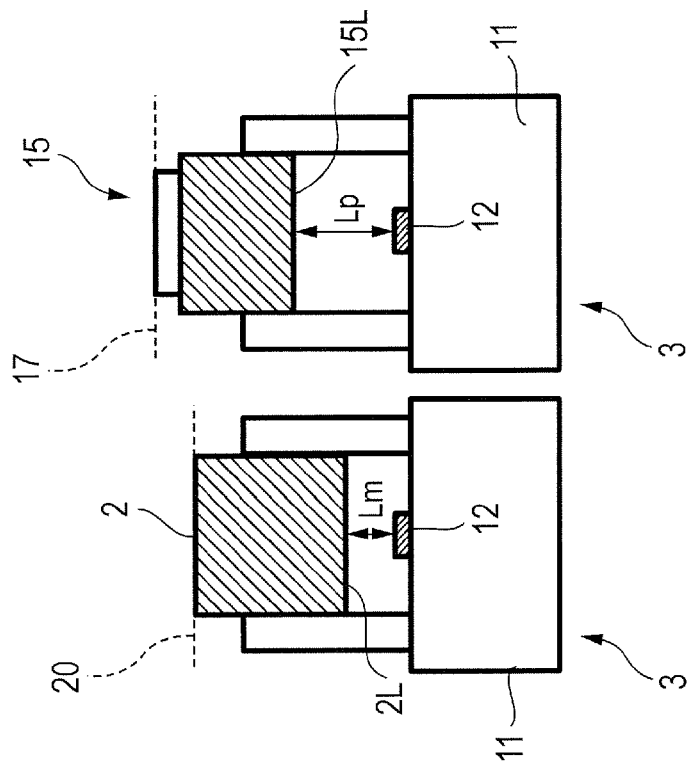
FIG. 7B is a diagram illustrating the difference in position between the measurement plane for the workpiece and the calibration plane.
Figure 7A:
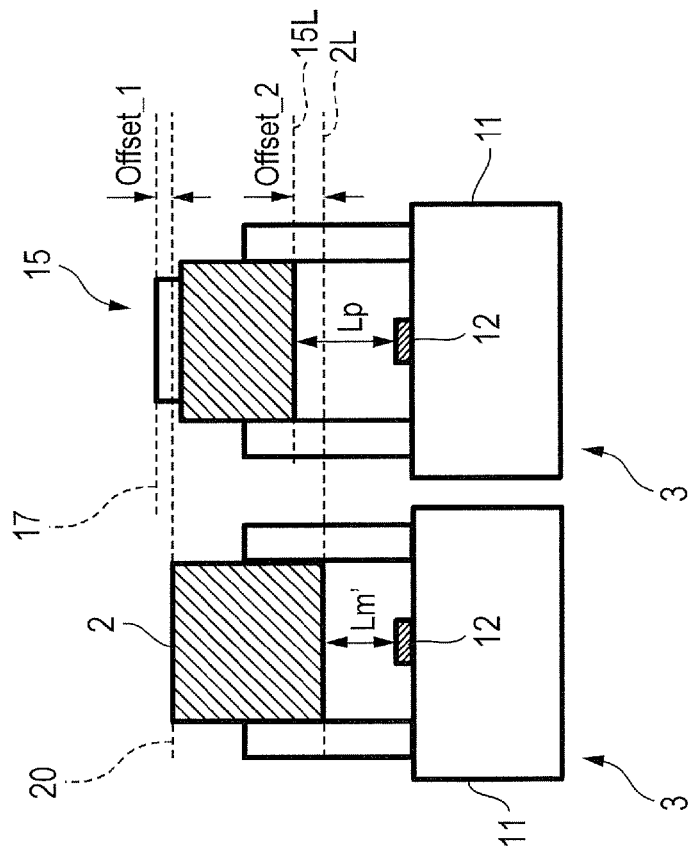
FIG. 7A is a diagram illustrating an initial displacement between the calibration reference and the workpiece.

More specifically, FIG. 7A is a diagram comparing the case where the chuck 3 grips the workpiece 2 at the reference position and the case where the chuck 3 grips the calibration reference 15 for acquiring the reference external parameters 114. As illustrated in FIG. 7A, owing to the difference in shape between the workpiece 2 and the calibration reference 15, there is a first initial displacement Offset_1 between the calibration plane 17 and the measurement plane 20. Furthermore, there is a second initial displacement Offset_2 between the undersurfaces 2L and 15L of the workpiece 2 and the calibration reference 15 measured by the length measuring instrument 12. That is, the difference between the detected value Lm' by the length measuring instrument when the workpiece 2 is gripped at the reference position and the detected value Lp by the length measuring instrument in calibration on the reference external parameters is the second initial displacement Offset_2. Accordingly, the difference in position in the grip position direction (Z-axis direction) between the calibration plane 17 and the measurement plane 20 is calculated in consideration of the initial displacements Offset_1 and Offset_2.

That is, as illustrated in FIG. 7B, provided that the distance to the undersurface 2L of the workpiece 2 measured by the length measuring instrument 12 when the workpiece 2 is gripped is Lm, the difference ΔL due to change of the grip position of the workpiece 2 is represented by Equation (3).

$$\Delta L = Lp - Lm - \text{offset\_2}$$ Equation 3

The control unit 10 calculates the actual difference between the calibration plane 17 and the measurement plane 20 as Offset_1+ΔL.

After the difference in position in the grip direction between the calibration plane 17 and the measurement plane 20 is calculated, the control unit 10 corrects the reference external parameters 114 such that the calibration plane 17 and the measurement plane 20 coincide with each other based on the difference calculated by the step of calculating a difference (S12, a step of correcting the external parameters). More specifically, the value of the position Zp in the grip direction by Equation (4) representing the relationship between the position [u, v] of the workpiece 2 on the image and the actual position is set to the difference Offset_1+ΔL such that the measurement plane 20 for the workpiece 2 coincides with the calibration plane 17.

$$s \begin{bmatrix} u \\ v \\ 1 \end{bmatrix} = A[R, t] \begin{bmatrix} Xp \\ Yp \\ \text{Offset\_1} + \Delta L \\ 1 \end{bmatrix} \quad \text{Equation 4}$$

The control unit 10 measures the two-dimensional position of the workpiece 2 by solving the simultaneous equations of Equation (4) (S13, a step of two-dimensional measurement), and adopts the position as a measurement result (S14). That is, the control unit 10 measures the two-dimensional position of the workpiece 2 using the corrected external parameters.

The measurement of the two-dimensional position of one measurement point (e.g., the center (gravity center) of the workpiece) of the workpiece 2 has been described above. Measurement of at least two points or preferably at least three points of the workpiece 2 and the calibration reference 15 can also identify the posture of the workpiece 2.

Thus, the image measurement apparatus 1 causes a single or a plurality of length measuring instruments (length measuring sensor) 12 to measure the position and/or the posture of the measurement plane 20 for the workpiece 2. The control unit 10 stores the reference external parameters 114 of the camera 6 and one of the position and the posture of the calibration plane 17 where the reference external parameters 114 are calibrated. The control unit 10 corrects the reference external parameters 114 such that the one of the position and the posture of the measurement plane 20 and the calibration plane 17 coincide with each other. Accordingly, also in the two-dimensional measurement on the position of the workpiece in the XY-axes directions, the two-dimensional position and/or posture of the workpiece can be accurately measured in consideration of the Z-axis direction due to the deviation of the grip position caused when the workpiece 2 is gripped.

Only if the relative difference between the measurement plane 20 and the calibration plane 17 is acquired, the reference external parameters 114 can be corrected. Thus, the reference external parameters 114 can be corrected with a low calculation load without acquiring the three-dimensional positions of the measurement plane 20 and the calibration plane 17. Accordingly, every time when the grip position of the workpiece 2 deviates, the grip position of the workpiece 2 orthogonal to the calibration plane 17 is measured by the length measuring instrument 12, thereby allowing the external parameters to be corrected simply and accurately.

The length measuring sensor that measures the grip position of the workpiece 2 may be a noncontact measuring instrument, such as a ultrasonic sensor, or a contact measuring instrument, such as a dial gauge. This embodiment has the configuration where the length measuring instrument is disposed at the chuck 3. However, the configuration is only required to measure the grip position of the workpiece 2. For instance, the instrument may be disposed at a position distant from the chuck 3.

Second Embodiment

An image measurement apparatus according to a second embodiment of the present invention will now be described. The second embodiment is different from the first embodiment in that a stereo camera 31 is used to measure the positions and/or the postures of the calibration plane 17 and the measurement plane 20. The description on the configurational components analogous to those of the first embodiment is omitted from the following description.

Figure 8:
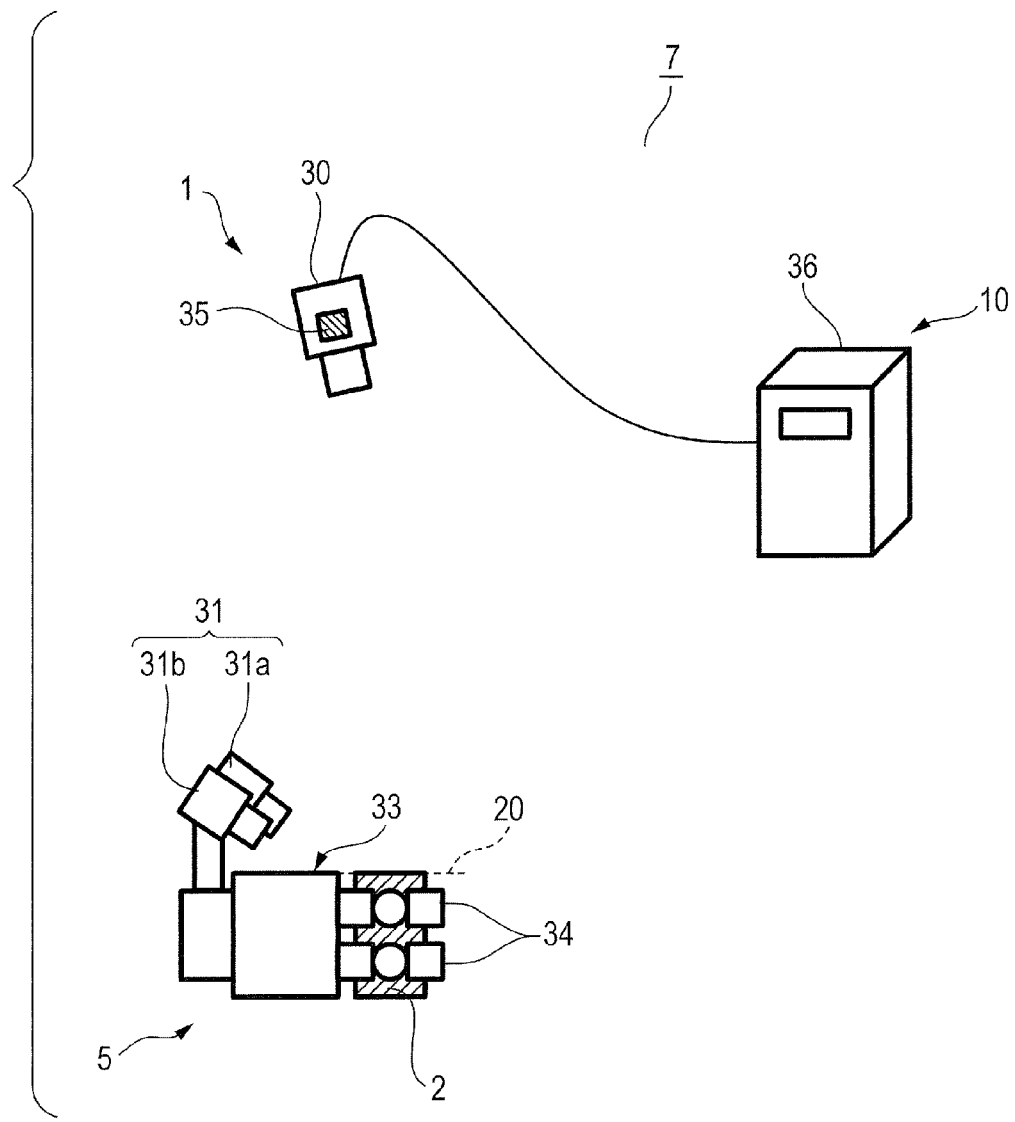
FIG. 8 is a schematic diagram illustrating an automatic assembling apparatus including an image measurement apparatus according to a second embodiment of the present invention.

As illustrated in FIG. 8, the image measurement apparatus 1 includes a multi-fingered robot hand (hereinafter, simply called a robot hand) 33 as the holding device that holds the workpiece 2. As with the first embodiment, the robot hand 33 is attached to the distal end of the robot arm 5, and includes a plurality of fingers 34 including movable joints. The fingers 34 grip the workpiece 2.

The image measurement apparatus 1 further includes a monocular camera (a first camera; hereinafter, simply called a camera) 30 as a camera for measuring the positional posture of the workpiece 2. The camera 30 is a smart camera integrally incorporating the calculating device 35. The calculating device 35 serves as an image processing device that processes a taken image. The calculating device 35 and an external computer 36 that issues an imaging instruction to the camera 30 configure the control unit 10 of the image measurement apparatus 1. The external computer 36 has a configuration analogous to that of the control unit in the first embodiment.

The image measurement apparatus 1 further includes a stereo camera (second camera) 31 provided at the robot hand 33 as a detecting device that detects the position and/or the posture of the measurement plane 20 for the workpiece 2. The stereo camera 31 can perform three-dimensional measurement through use of parallax information of left and right cameras 31a and 31b, and takes an image used for three-dimensionally measuring a characteristic point (prescribed point) on the workpiece.

The image measurement apparatus 1 uses the stereo camera 31 to take an image of the characteristic point on the workpiece, thereby detecting the positions and/or the postures of the calibration plane 17 and the measurement plane 20. This apparatus 1 is different in this feature from the apparatus of the first embodiment. Two-dimensional measurement on the workpiece 2 by the image measurement apparatus 1 will hereinafter be described mainly on this difference.

The image measurement apparatus 1 causes the control unit 10 to store dimension information at the time of arbitrarily designing the characteristic point 2a of the workpiece 2, and uses this workpiece itself as the calibration reference to calibrate the external parameters of the camera 30.

Figure 9:
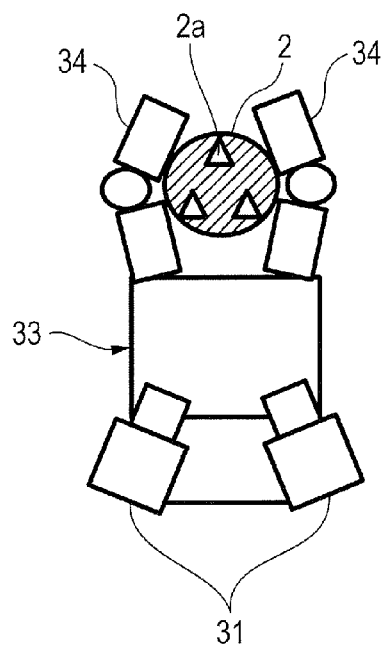
FIG. 9 is a schematic diagram illustrating a state where the image measurement apparatus in FIG. 8 calibrates external parameters.

More specifically, as illustrated in FIG. 9, when the workpiece 2 to be the reference is gripped by the robot hand 33, an image is taken by the camera 30, and the characteristic point 2a of the workpiece 2 is used as the marker for the calibration reference to calibrate the external parameters according to a method analogous to that of the first embodiment.

At the same time, the image measurement apparatus causes the stereo camera 31 to take images of the characteristic points 2a of the workpiece 2. The control unit 10 three-dimensionally measures the position of each characteristic point 2a from the taken stereo images according to the stereo method. The control unit 10 calculates the positional posture Hp of the calibration plane 17 from the three-dimensional positions of the characteristic points 2a, and stores the positional posture.

Next, two-dimensional measurement on the positional posture of the workpiece 2 will be described. When the workpiece 2 is gripped by the robot hand 33, the images of the measurement plane 20 for the workpiece 2 on which the characteristic points 2a exist are taken by the camera 30 and the stereo camera 31.

After the images of the characteristic points 2a are taken by the stereo camera 31, the control unit 10 measures the three-dimensional positions of the characteristic points 2a as with the calibration on the reference external parameters 114, and calculates the positional posture Hm of the measurement plane 20 for the workpiece 2, from the three-dimensional positions of the characteristic points 2a.

Figure 10:
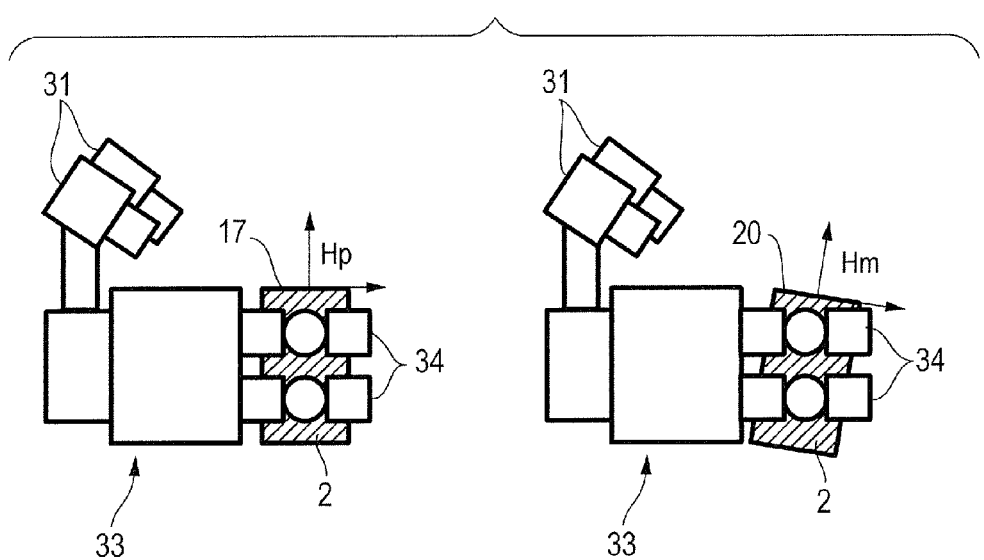
FIG. 10 is a diagram illustrating the difference in positional posture between the measurement plane for the workpiece and the calibration plane.

FIG. 10 is a diagram comparing calibration on the reference external parameters 114 with the two-dimensional measurement on the workpiece 2. As illustrated in FIG. 10, the positional posture Hp of the calibration plane 17 deviates from the positional posture Hm of the measurement plane 20. After the control unit 10 acquires the positions and postures Hp and Hm of the calibration plane 17 and the measurement plane 20, this unit calculates the difference ΔH between the calibration plane 17 and the measurement plane 20 according to Equation (5).

$$\Delta H = Hp - Hm \quad \text{Equation 5}$$

After the difference ΔH is acquired, the control unit 10 corrects the reference external parameters 114 such that the difference ΔH is eliminated, i.e., such that the calibration plane 17 coincides with the measurement plane 20. The corrected external parameters are represented as [R', t'].

At the same time of the correction of the external parameters, the control unit 10 calculates the coordinates [u, v] of the characteristic points 2a on the image of the workpiece 2 from the image taken by the camera 30. The control unit 10 solves the simultaneous equations of the Equation (6), in which the corrected external parameters [R', t'] is applied to Equation (1) associating the coordinates of the image coordinate system with the coordinates of the world coordinate system, thereby acquiring the two-dimensional position [Xp, Yp] of the characteristic point 2a of the workpiece 2. Analogous procedures are applied to each characteristic point 2a, thereby acquiring the posture of the workpiece 2.

$$s \begin{bmatrix} u \\ v \\ 1 \end{bmatrix} = A[R', t'] \begin{bmatrix} Xp \\ Yp \\ 0 \\ 1 \end{bmatrix} \quad \text{Equation 6}$$

The reference external parameters are thus corrected such that the calibration plane 17 after calibration on the reference external parameters coincides with the measurement plane 20 for the workpiece 2, thereby allowing the two-dimensional positional posture of the workpiece 2 to be correctly measured even if the grip position of the workpiece 2 deviates.

The grip position of the workpiece 2 is detected using the image measuring method as with the measurement of the positional posture of the workpiece 2, thereby allowing the point on which the position and the posture of the workpiece is measured to coincide with the point on which the grip position is detected. This coincidence can reduce error factors.

In this embodiment, the workpiece itself is used as the calibration reference. However, a standard accurately fabricated into the shape identical to that of the workpiece may be used. The second camera is not necessarily the stereo camera. Instead, the second camera may be one camera. In this case, any of methods, such as the motion stereo method, three-dimensional CAD matching, perspective distortion calculation, light-section method, and spatial coding method, is used to detect the calibration plane 17 and the measurement plane 20.

Third Embodiment

A third embodiment of the present invention will now be described. The third embodiment is different from the first and second embodiments in that a contact sensor is used to measure the positions and/or the postures of the calibration plane 17 and the measurement plane 20. The description on the configurational components analogous to those of the first and second embodiments is omitted from the following description.

Figure 11:
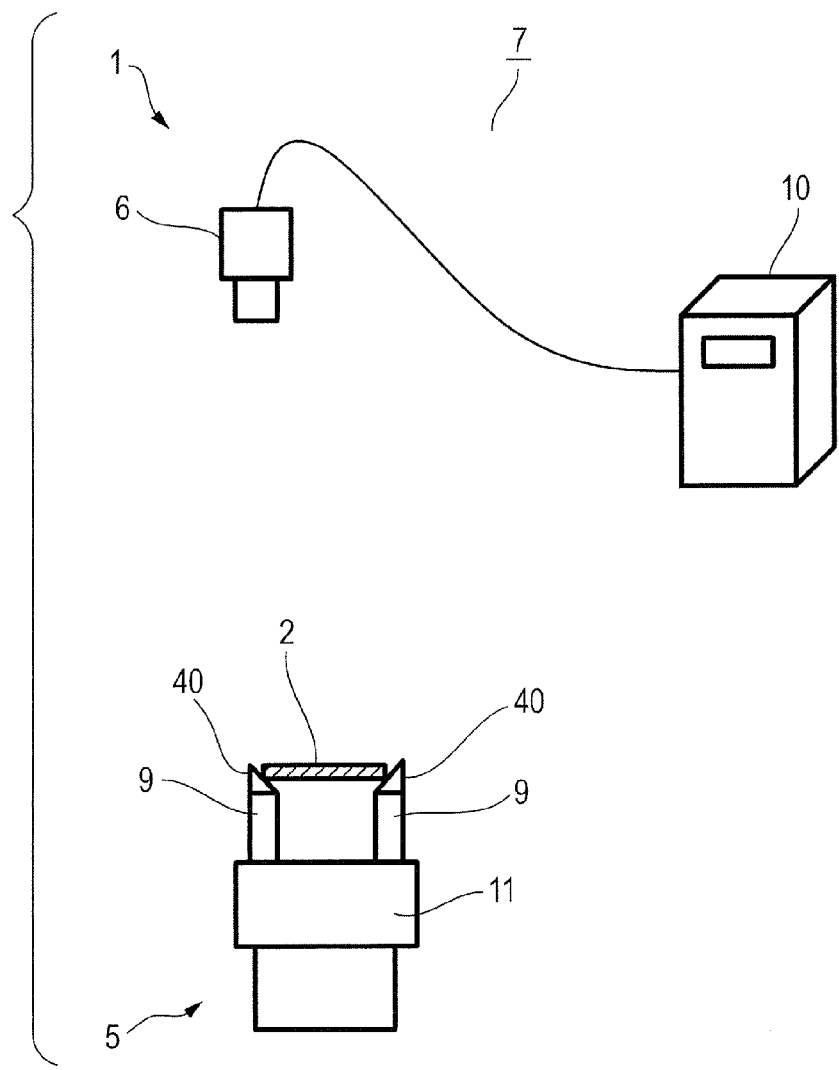
FIG. 11 is a schematic diagram illustrating an automatic assembling apparatus including an image measurement apparatus according to a third embodiment of the present invention.

As illustrated in FIG. 11, the image measurement apparatus 1 includes a pressure distribution sensors 40 provided at the distal ends of the fingers 9 of the chuck (holding device) 3 as the detecting device that detects the position and/or the posture of the measurement plane for the workpiece. The pressure distribution sensors 40 are force sensors where a plurality of sensors for detecting applied forces are provided on a surface. The surface in contact with the workpiece 2 is formed to be inclined as a tapering shape.

Figure 12:
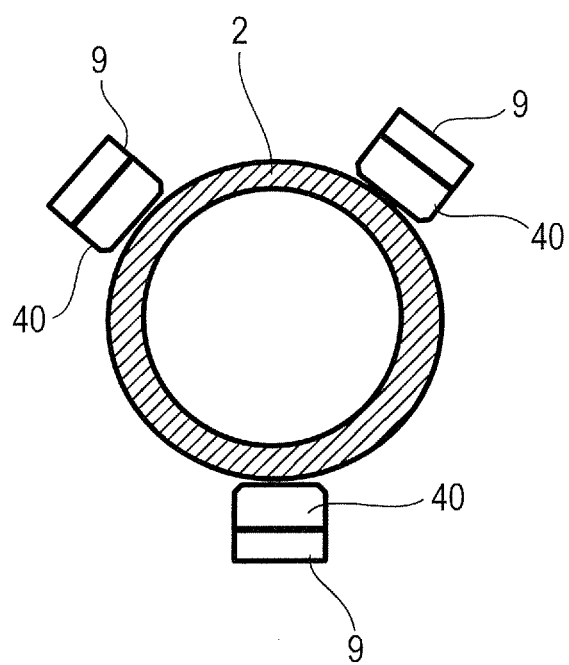
FIG. 12 is a plan view illustrating a state where a holding device according to the third embodiment of the present invention holds a workpiece.

More specifically, as illustrated in FIG. 12, the pressure distribution sensors 40 are provided at the respective distal ends of the three fingers 9. The pressure distribution sensors 40 are contact sensors that can detect a contact point between the workpiece 2 and the fingers 9 (holding device) by calculating the gravity center of a force detection distribution of the pressure distribution sensors. Furthermore, the sensor 40 can detect the position and posture of a plane by detecting the positions of three contact points. In the case where the number of fingers 9 is two, the grip positional posture is two-dimensionally corrected. In the case of four or more, a plane closest to a plurality of detection points is calculated using the least-square method or the like; three-dimensional detection can be performed based on this plane.

Accordingly, on calibration on the external parameters, the image measurement apparatus 1 can acquire the positional posture Hp of the calibration plane 17 by acquiring the positions of the contact points of the fingers 9 at the time when the chuck 3 grips the calibration reference. Likewise, when the workpiece 2 is two-dimensionally measured, the positional posture Hm of the measurement plane 20 can be acquired by acquiring the positions of the contact points of the fingers 9 at the time when the chuck 3 grips the workpiece 2.

Provided that the initial displacement between the positional posture Hm' of the measurement plane 20 measured when the workpiece 2 is gripped at the reference position and the positional posture Hp of the calibration plane 17 is Hoffset, the control unit 10 can calculate the difference ΔH between the calibration plane 17 and the measurement plane 20 according to Equation (7).

$$\Delta H = Hp - Hm - H\text{offset} \quad \text{Equation 7}$$

Thus, the image measurement apparatus 1 can correct the reference external parameters using the difference ΔH between the calibration plane 17 and the measurement plane 20 according to the method analogous to that of the second embodiment, and accurately measure the two-dimensional positional posture of the workpiece.

The grip position is detected using the force detection sensor provided at the position at which the workpiece is gripped. Accordingly, the presence and absence of a workpiece can be detected in the step of gripping the workpiece 2. Thus, if the workpiece cannot be gripped owing to any cause, a grip error can be detected before the step of detecting the workpiece grip position. Accordingly, a time for retrying grip of the workpiece can be reduced. Furthermore, erroneous recognition on the presence and absence of the workpiece can be prevented.

In the first to third embodiments, the chuck and the robot hand are used as the holding device that holds the workpiece 2. However, the device is not limited thereto, only if the device can hold a workpiece. For instance, the device may be a suction holding device that sucks to hold the workpiece.

The holding device is not necessarily attached to the distal end of the robot hand. For instance, the device may be disposed on a drive device arranged on rails. Furthermore, it is a matter of course that the aspects of the invention described in the first to third embodiments may be combined in any manner.

The present invention corrects external parameters such that the calibration plane where the external parameters are calibrated coincides with the measurement plane for the workpiece. Accordingly, even if the measurement plane deviates from the calibration plane, a workpiece can be accurately and two-dimensionally measured using the corrected external parameters.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105101, filed May 2, 2012, which is hereby incorporated by reference herein in its entirety.

What is claimed is:

1. An image measurement apparatus, comprising:
   a first camera that takes an image of a workpiece held by a holding device;
   a detecting device provided on the holding device that detects a position and/or a posture of a measurement plane for the workpiece held by the holding device; and
   a control unit that stores external parameters of the first camera and a position and/or a posture of a calibration plane where the external parameters are calibrated, stores the position and/or the posture of the measurement plane for the workpiece detected by the detecting device while the workpiece is held by the holding device, corrects the external parameters based on a detected value by the detecting device such that the positions and/or the postures of the measurement plane and the calibration plane coincide with each other, and measures a two-dimensional position and/or a posture of the workpiece held by the holding device from the image taken by the first camera using the corrected external parameters.

2. The image measurement apparatus according to claim 1, wherein the detecting device is a length measuring sensor that detects a holding position of the workpiece orthogonal to the calibration plane.

3. The image measurement apparatus according to claim 1, wherein the detecting device is a second camera that takes an image used for three-dimensionally measuring a prescribed point on the workpiece.

4. The image measurement apparatus according to claim 1, wherein the detecting device is a contact sensor that is provided at the holding device and detects a contact point between the holding device and the workpiece.

5. An automatic assembling apparatus, comprising:
   the image measurement apparatus according to claim 1;
   the holding device; and
   a robot arm comprising the holding device.

6. An image measurement method of causing a camera whose external parameters are calibrated, to take an image of a workpiece held by a holding device, and measuring a two-dimensional position and/or a posture of the workpiece based on the taken image, the method comprising causing a calculating device to execute the steps of:
   calculating a difference between a calibration plane where the external parameters are calibrated and a measurement plane for the workpiece detected by a detecting device provided on the holding device whenever the workpiece is held by the holding device;
   correcting the external parameters based on the difference such that positions and/or postures of the measurement plane and the calibration plane coincide with each other; and
   two-dimensionally measuring a two-dimensional position and/or posture of the workpiece held by the holding device from the image taken by the camera using the external parameters corrected by the correcting of the external parameters.

7. A non-transitory recording medium storing an image measurement program causing a computer to execute the processes of the image measurement method according to claim 6.

8. The image measurement apparatus according to claim 1, wherein the holding device comprises a plurality of fingers and a main body on which the plurality of fingers are provided, and
   wherein the detecting device that detects the workpiece gripped by the plurality of fingers is provided on the main body.

9. The image measurement apparatus according to claim 8, wherein the detecting device is a length measuring instrument.

* * * * *